(12) United States Patent
Miller et al.

(10) Patent No.: US 8,115,615 B2
(45) Date of Patent: Feb. 14, 2012

(54) STATUS INDICATOR AND REMINDER SYSTEM FOR VEHICLE TEMPORARY MOBILITY KIT

(75) Inventors: Thomas Lee Miller, Ann Arbor, MI (US); Kimberly Ann Steele, Northville, MI (US); Scott Alan Watkins, Sterling Heights, MI (US)

(73) Assignee: Ford Global Technologies, Dearborn, MI (US)

( * ) Notice: Subject to any disclaimer, the term of this patent is extended or adjusted under 35 U.S.C. 154(b) by 1151 days.

(21) Appl. No.: 11/852,275

(22) Filed: Sep. 8, 2007

(65) Prior Publication Data

US 2009/0066487 A1 Mar. 12, 2009

(51) Int. Cl.
*B60Q 1/00* (2006.01)
(52) U.S. Cl. .............. 340/457; 340/425.5; 340/309.16; 340/457.4; 701/30
(58) Field of Classification Search .............. 340/425.5, 340/309.16, 540, 584, 457–457.4; 702/176–178, 702/184, 79; 701/30; 368/10, 12, 89
See application file for complete search history.

(56) References Cited

U.S. PATENT DOCUMENTS

| | | | |
|---|---|---|---|
| 5,442,669 A | 8/1995 | Medin | |
| 5,705,977 A | 1/1998 | Jones | |
| 5,721,527 A | 2/1998 | Simmons et al. | |
| 5,910,931 A | 6/1999 | Pettyjohn | |
| 6,445,967 B1 | 9/2002 | Travagline et al. | |
| 6,490,543 B1* | 12/2002 | Jaw | 702/184 |
| 6,501,390 B1 | 12/2002 | Chainer et al. | |
| 6,618,261 B1 | 9/2003 | Gaboury et al. | |
| 6,668,875 B2 | 12/2003 | Kojima et al. | |
| 6,784,794 B1 | 8/2004 | McQuade | |
| 6,795,376 B2 | 9/2004 | Quine | |
| 6,812,825 B1 | 11/2004 | Volk | |
| 6,829,520 B1 | 12/2004 | Green | |
| 6,922,154 B2* | 7/2005 | Kraljic et al. | 340/687 |
| 6,964,284 B2 | 11/2005 | Eckhardt | |
| 6,985,076 B1 | 1/2006 | Bennie et al. | |
| 6,985,408 B2 | 1/2006 | Quine | |
| 7,026,922 B1 | 4/2006 | Talukder et al. | |

(Continued)

FOREIGN PATENT DOCUMENTS

DE 4305172 A1 8/1994

(Continued)

OTHER PUBLICATIONS

Stop & Go International, "Tire Mobility Kit" product details, 1998, 2 pages, www.stopngo.com/Contents/5000.asp.

(Continued)

*Primary Examiner* — Anh V La
(74) *Attorney, Agent, or Firm* — Angela M. Brunetti; Fredrick Owens (57) ABSTRACT

A status indicator and reminder system for use with a vehicle having a tire sealant-containing temporary mobility kit is provided. The system includes a signal provided for viewing by the operator which indicates that the temporary mobility kit requires servicing. The need for servicing can be based on certain variables, including the passage of a pre-determined period of time or on changes in temperature which may impact the effective life of the sealing compound. In addition, the need for servicing can be based on a sensed of the temporary mobility kit from the vehicle.

20 Claims, 9 Drawing Sheets

U.S. PATENT DOCUMENTS

| | | | |
|---|---|---|---|
| 7,092,804 | B2 | 8/2006 | McQuade et al. |
| 7,118,017 | B1 | 10/2006 | Geraghty et al. |
| 7,289,016 | B2 * | 10/2007 | Luebke et al. ........... 340/309.16 |
| D557,299 | S | 12/2007 | Marini et al. |
| D613,320 | S | 4/2010 | Marini |
| 7,694,698 | B2 | 4/2010 | Marini |
| 7,695,312 | B2 | 4/2010 | Steele et al. |
| 7,789,110 | B2 | 9/2010 | Marini |
| 2004/0159365 | A1 | 8/2004 | Cowan et al. |
| 2008/0277044 | A1 | 11/2008 | Marini |
| 2009/0266440 | A1 | 10/2009 | Lolli et al. |
| 2009/0301602 | A1 | 12/2009 | Lolli et al. |
| 2010/0005930 | A1 | 1/2010 | Lolli et al. |

FOREIGN PATENT DOCUMENTS

| | | |
|---|---|---|
| DE | 19527894 A1 | 1/1997 |
| DE | 19709445 A1 | 9/1998 |
| GB | 2331053 A | 5/1999 |
| WO | WO 2005/085028 | 9/2005 |
| WO | WO 2007/102066 | 9/2007 |
| WO | WO 2008/001179 | 1/2008 |
| WO | WO 2009/019590 | 2/2009 |
| WO | WO 2009/027792 | 3/2009 |
| WO | WO 2009/156817 | 12/2009 |

OTHER PUBLICATIONS

Mona, "Fix-A-Flat: Spare Yourself Some Grier", www.epinions.com/content_254719790724, Sep. 15, 2006, 4 pages.

U.S. Appl. No. 11/894,390, filed Aug. 12, 2007, Yingchao Quan.

U.S. Appl. No. 12/023,542, filed Jan. 31, 2008, Kimberly Steele.

RE 95/000,581, Steele.

Richards, John, Letter of Jun. 28, 2010 from TEK Global contesting inventorship, 2 pages.

U.S. Patent No. 7,695,312 titled "Cord Wrap and Power Receptacle Arrangement for Inflator" is now Inter Partes Reexamination No. 95/000,581, filed Dec. 9, 2010.

* cited by examiner

STATUS INDICATOR AND REMINDER SYSTEM FOR VEHICLE TEMPORARY MOBILITY KIT

CROSS REFERENCE TO RELATED APPLICATIONS

This invention claims priority to co-pending U.S. patent application Ser. No. 11/894,390, filed Aug. 20, 2007 and titled, "Switch and Hose-Valve Connection Arrangement for Vehicle Temporary Mobility Kit".

TECHNICAL FIELD

The present invention relates generally to portable inflator units. More particularly, the present invention relates to a status indicator and reminder system for a tire sealant-containing temporary mobility kit in a vehicle.

BACKGROUND OF THE INVENTION

Automotive manufacturers have traditionally offered spare tires with the fleet of vehicles they produce. In the early days of automobiles the spare tire was mounted externally on either the running board or on a rear-mounted tire carrier. To comply with advances in styling the spare tire was concealed, most typically being moved inside the vehicle's trunk. While this arrangement provided a suitable solution for placement of the spare tire for decades, changes in fuel economy requirements dictated the need for vehicle weight reduction. Manufacturers reviewed the vehicle anew in its entirety seeking ways to reduce vehicle weight. One answer to the effort to reduce overall vehicle weight was to replace the conventional, large and bulky road tire with a smaller temporary tire or "donut."

While the temporary tire represented a significant decrease in overall vehicle weight, the further improvement in tire design and durability as well as the concurrent general improvement in roadways gradually began to reduce the need for relying on a spare tire at all.

In response to these advances in both tire technology and road quality, vehicle auto manufacturers have begun to substitute a "temporary mobility kit" (or "TMK") for the spare tire. The TMK includes a dual-purpose air compressor and a sealing system. The sealing system includes a sealing compound that will effectively seal most punctures caused by nails or similar objects. The air compressor drives the sealing compound into the compromised tire and, subsequently, can be used to reinflate the tire. The growing trend today is for manufacturers to equip the vehicle with a temporary mobility kit within a space provided in the vehicle, such as (but not exclusively) in the spare tire well of the trunk.

Like the spare tire which it effectively (if not actually) replaces, the temporary mobility kit is disposed well out of the way of the vehicle operator and thus is frequently overlooked as part of ordinary vehicle maintenance. However, while the sealing and flow characteristics of the sealant of the temporary mobility kit are largely resistant to the passage of time while stored in the substantially oxygen-free environment of the sealant canister, eventually attention must be given to the temporary mobility kit according to a fairly predictable schedule.

While providing clear advantages over the weight demands of the spare tire as well as providing the vehicle operator with a practical alternative over the demands of tire changing, as in most every area of vehicle technology the development of temporary mobility kits and their relation to the vehicle are in a continuing state of development.

SUMMARY OF THE INVENTION

A preferred embodiment of the disclosed invention is a status indicator and reminder system for use with a vehicle where the vehicle includes a tire sealant-containing temporary mobility kit. The system includes an indicator mounted on the vehicle's instrument panel, a timer for generating a time signal corresponding to a time duration the temporary mobility kit has been in position in the vehicle, and a controller coupled to the indicator and the timer. The controller generates a service warning signal in response to the timer signal. As a variation a temperature sensor is additionally included which generates a temperature profile which can be used to modify the timer signal in the case where higher temperatures result in possible degradation of the tire sealant. An additional variation of the system is provided in which a feedback system is used to notify the operator that servicing of the temporary mobility kit may be necessary because the kit has been removed from the vehicle. A re-set arrangement is further provided to allow the operator to re-set the system after servicing of the temporary-mobility kit.

Other features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiment illustrated in greater detail in the accompanying drawings and described below by way of examples of the invention wherein.

DETAILED DESCRIPTION OF THE PREFERRED EMBODIMENT

In the following figures, the same reference numerals will be used to refer to the same components. In the following description, various operating parameters and components are described for one constructed embodiment. These specific parameters and components are included as examples and are not meant to be limiting.

Figure 1:
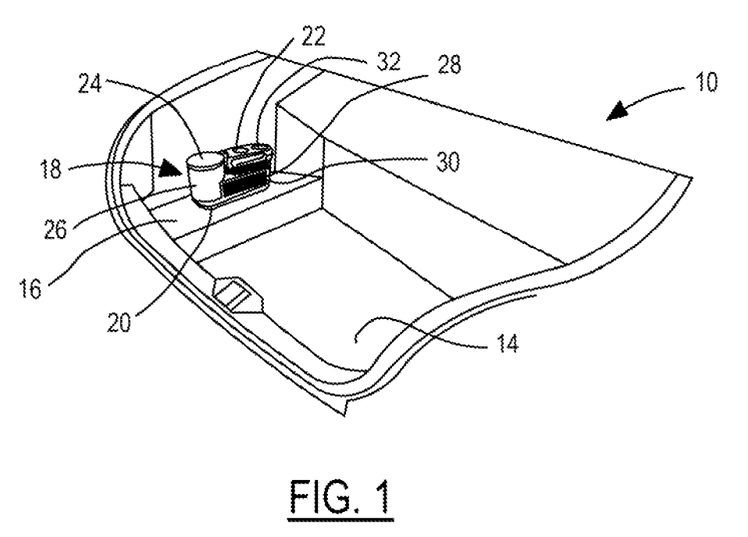
FIG. 1 illustrates a perspective view of an opened trunk of a vehicle showing the temporary mobility kit in its stored position.

The disclosed invention teaches a status indicator and reminder system for a temporary mobility kit (occasionally referred to hereinafter as "TMK") for use with any vehicle having pneumatic tires. The temporary mobility kit may be located in many places on a vehicle, but is preferably located in the vehicle's trunk in place of (or in conjunction with) the vehicle's spare tire. Referring to FIG. 1, a perspective view of a vehicle trunk, generally illustrated as 10, is shown. The trunk 10 is formed in a particular shape to conform to the rear wheel wells fuel tank and other components of the vehicle and includes a generally vertical front wall, commonly referred: to as the waterfall. The trunk 10 also includes a floor 14 and a shelf or side ledge 16.

A temporary mobility kit 18 is shown positioned in a docking station 20 formed in the side ledge 16. The temporary mobility kit 18 includes a switch-inflator assembly 22 and a sealant assembly 24. The sealant assembly 24 includes a sealant canister 26 which contains a flowable tire sealant compound. The switch-inflator assembly 22 includes a sealant hose 28 and an air hose 30. A selector switch 32 is provided with the switch-inflator assembly 22. In use, the operator attaches the sealant hose 28 to the damaged vehicle tire and manipulates the selector switch 32 so that the sealant compound flows out of the sealant canister 26 of the sealant assembly 24 and into the compromised tire by way of the sealant hose 28. Once the provided quantity of sealant compound has been exhausted, the operator then manipulates the selector switch 32 so that air flows through the sealant hose 28 to re-fill the tire. In the event that only air and not sealant is needed, the operator attaches the air hose 30 to the article needing inflation and the sealant function is not used. (The temporary mobility kit 18 and the elements described above are more clearly seen in FIGS. 6 and 7.)

The position of the docking station 18 is only illustrative as the temporary mobility kit, 20 may be disposed in a number of areas in the trunk 10 (or, in fact, in the vehicle itself), including, for example, the well formed for the spare tire.

Over time it may well become necessary for attention to be given to the sealant canister 26 of the temporary mobility kit 10, either because of age of the sealant compound or because of possible use of the compound. It is ordinary for a vehicle operator to need to be reminded or informed of the status of a vehicle component, and the temporary mobility kit 10 is no exception.

Figure 2:
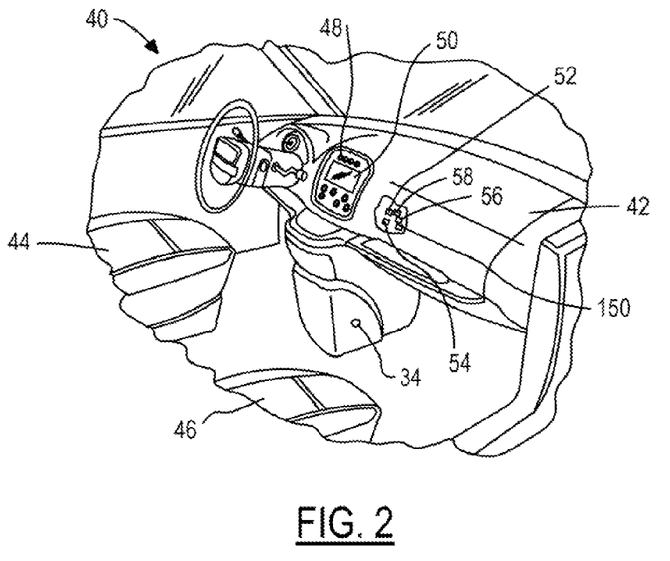
FIG. 2 illustrates a partial perspective view of a vehicle interior including the vehicle's instrument panel.

Referring to FIG. 2, a partial perspective view of the interior of a vehicle, generally illustrated as 40, is shown. The vehicle interior includes an instrument panel 42, a driver seat 44, and a passenger seat 46. Located on the instrument panel 42 is a message center 48. While the message center 48 is illustrated as being centrally located on the instrument panel 42, it is to be understood that the message center 48 may be located in other places relative to the instrument panel, such as by the instrument cluster located forward of the steering wheel. Alternatively, the message center 48 may be incorporated into the vehicle's overhead console, if present.

Regardless of the placement of the message center 48, a status/reminder indicator 50 is provided on the message center 48. The status/reminder indicator 50 is preferably a visual indicator, but may be an audio indicator as well. The status/reminder indicator 50 is provided to inform the driver that attention must be given to the temporary mobility kit, either because the sealant component of the TMK is nearing or has passed its estimated useful life or because the TMK has been removed from the vehicle and the sealant component may need to be replaced. The status/reminder indicator 50 may be a simple light, a light having an illuminated message ("Service Temporary Mobility Kit"), or a simple message ("Service Temporary Mobility Kit"). The status/reminder indicator 50 is operatively associated with a controller 52 which is itself associated with a timer 54. In addition, a temperature sensor 56 is also operatively associated with the controller 52. It is to be noted that the placement of the controller 52, the timer 54, and the temperature sensor 56 is shown for illustrative purposes only, and these elements can be placed at other places in the vehicle. Also it: is to be understood that while a temperature sensor is provided as sensor 56 herein it may well be that no additional sensor is required. This is the case particularly with newer vehicles in which temperature sensors are ordinarily provided as part of the vehicle network. However, an additional temperature sensor may be provided with the temporary mobility kit 18 in relation to the sealant canister 26.

Figure 3:
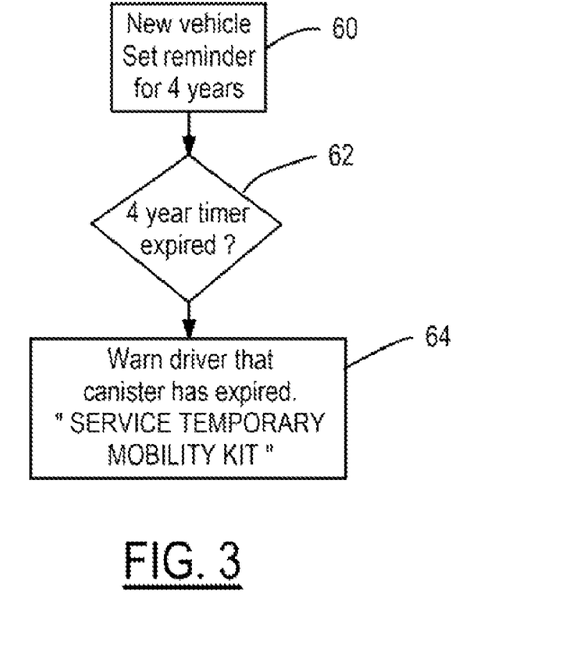
FIG. 3 is a flow chart according to a first embodiment of the disclosed invention.

FIG. 3 illustrates an algorithm according to a first embodiment of the disclosed invention to determine whether or not a signal should be sent to the message center 48 indicating that attention needs to be given to the temporary mobility kit 18. At a first step 60 the system is programmed to send a reminder to the message center 48 after a predetermined period, the period being assessed by the timer 54. As illustrated in step 60, the selected predetermined period is four years but any other period may be established. At a second step 62 a query is made as to whether or not the predetermined period has passed as assessed by the timer 54. At a third step 64, if the answer to the query at the second step 62 is "yes," then a message is sent by the controller 52 to the message center 48 in the form of an indication by the status/reminder indicator 50 that the life of the sealant canister 26 has expired and a replacement unit is needed.

Figure 4:
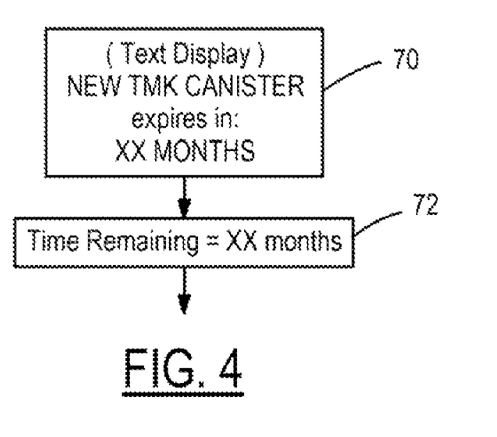
FIG. 4 is a flow chart illustrating the steps needed to re-set the system.

Once the life of the sealant canister 26 has expired, the service message has been provided to the operator, and the sealant canister 26 has been replaced, it will be necessary for the system to be re-set to a new expiration date. Referring to FIG. 4, an algorithm which illustrates the re-set steps is provided. At a first step 70, a text is displayed by the status/indicator light 50 in which language appears asking the person undertaking the re-set to enter a new expiration period. In the illustrated example the re-set time is given in months. At a second step 72 a reset time (again, according to the illustration, in months) is entered by the operator and the controller 52 is re-set. While there would not ordinarily be an indication of the status of the temporary mobility kit 18 if neither the effective time has expired nor has the kit 18 been used, it is possible that the status of the temporary mobility kit 18 could be indicated if the operator manipulates, for example, a "system check" button. In that event the time remaining before service for the temporary mobility kit 18 may be indicated.

While the algorithm in FIG. 3 discloses a simple, time-dependent approach to signaling the operator of the need to attend to the temporary mobility kit 18, it is possible that other variables can be taken into account to determine the effective life of the kit 18. For example, such variables may include ambient conditions such as temperature and pressure or may include other conditions experienced by the vehicle, such as vibration. By way of example, FIG. 5 discloses an algorithm having multiple variables, specifically including time and temperature variables. At a first step 80 the system is programmed to send a reminder to the message center 48 after a predetermined period, the period being assessed by the timer 54. As illustrated in step 80, the selected predetermined period is four years but any other period may be established. At a second step 82 the system calculates any degradation that may have been caused by elevated temperatures over time (in the illustrated case, at a temperature greater than 100° F.), the ambient temperature being determined by a temperature sensor 56.

Figure 5:
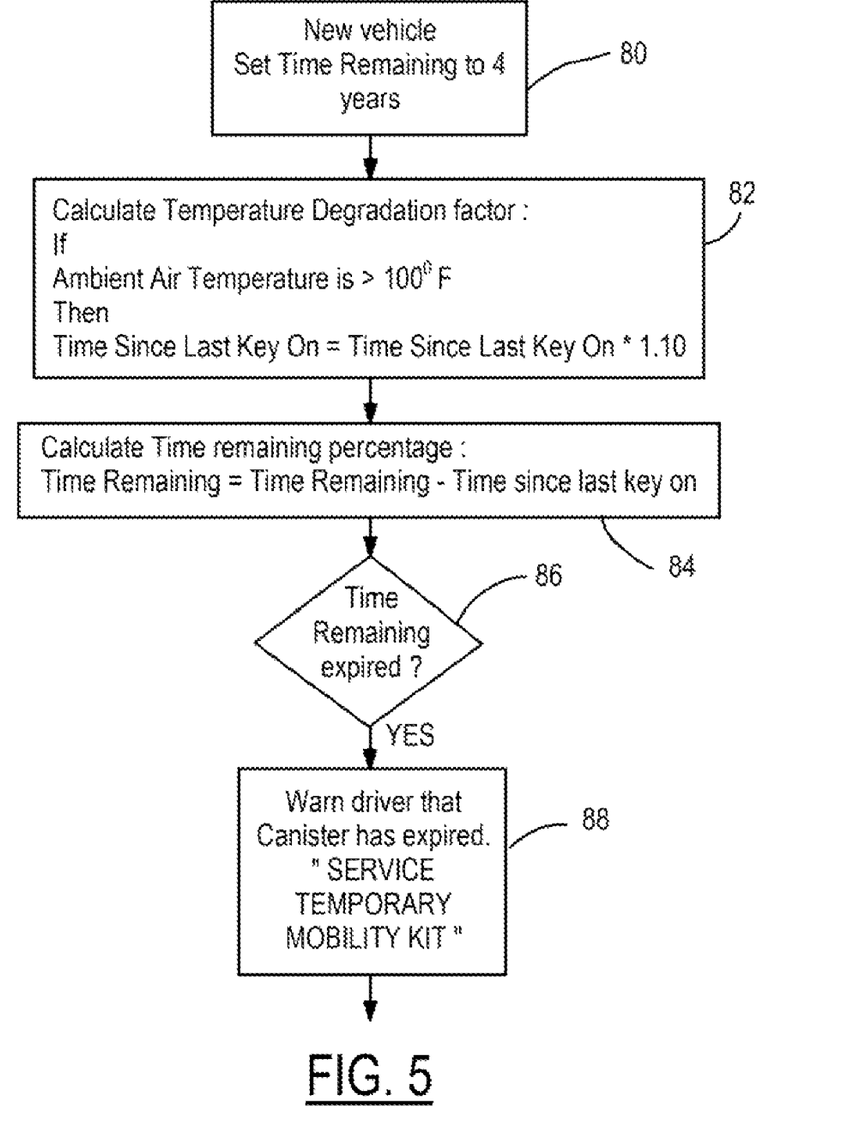
FIG. 5 is a flow chart according to a second embodiment of the disclosed invention.

At a third step 84 the system calculates the time remaining as assessed by the timer 54, taking into account the information generated at the second step 82. At a fourth step 86 the system takes into account the information generated at the third step 84 and queries whether or not the sealant canister 26 is expired. At a fifth step 88, if the answer to the query at the fourth step 86 is "yes," then a message is sent by the controller 52 to the message center 48 in the form of an indication by the status/reminder indicator 50 that service is required. If replacement of the sealant canister 26 is required, a re-set operation set forth in the algorithm of FIG. 4 is then undertaken after the sealant canister 26 has, in fact, been changed.

Accordingly the system disclosed herein may provide not only a reminder to the operator that a change of the sealant canister 26 is needed based on either the simple passage of time or on the passage of time as may be modified by certain ambient conditions. However, and as set forth above, the system may also provide information as to whether or not the temporary mobility kit 18 has been removed from the vehicle. It is to be understood that the temporary mobility kit 18 may be used for purposes other than sealing and refilling a damaged tire, since it is provided with the air hose 30 which may be used to inflate a tire which is not damaged. But, as a precaution, the system of the disclosed invention may alert the operator in the event that the temporary mobility kit 18 has been removed regardless of the reason, leaving it to the operator to re-set the system according to the method set forth in FIG. 4 and discussed in relation thereto.

A feedback component is provided to indicate to the driver that attention must be given to the temporary mobility kit 18 once it is removed from the vehicle. This warning will occur even if the temporary mobility kit 18 is reconnected with the vehicle. The removal of the temporary mobility kit 18 from the vehicle may be indicated in any of several ways, which generally include a break in a hard connection or by an adjacent sensor electrically sensing, without a direct connection, that the temporary mobility kit 18 has been moved.

Figure 6:
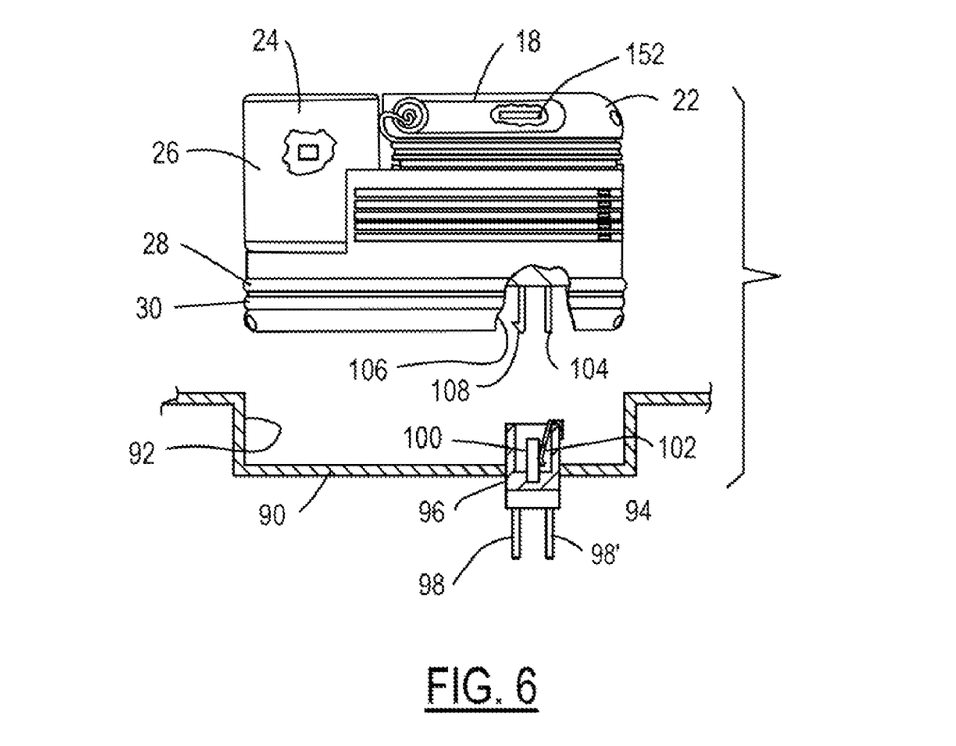
FIG. 6 illustrates a side view of the temporary mobility kit positioned above its docking station in the vehicle, shown in partial sectional view.
Figure 7:
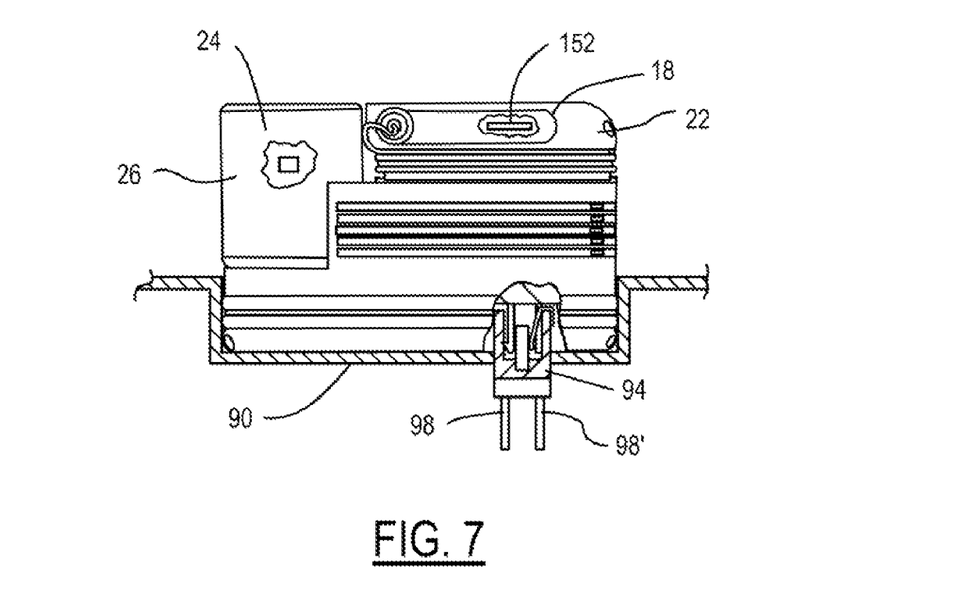
FIG. 7 is a view similar to that of FIG. 6 but illustrating the temporary mobility kit having been inserted into its docking station.

While either of these general systems may be employed in the disclosed invention, a preferred approach in the form of a shorting bar, is set forth in FIGS. 6 and 7. The temporary mobility kit 18 is positioned above and spaced apart from a docking system 90 which includes a kit receiving recessed area 92 and a conduit 94. The conduit 94 includes a housing 96 and a pair of lead wires 98, 98' which are integrated with the vehicle's electrical system to provide information as to the continuity of the circuit. The lead wires 98, 98' are electrically connected to a pair of parallel prongs 100 (only one is shown) in the housing 96. The shorting bar comprises a spring metal blade 102 normally spanning the two prongs, whereby a circuit is established across the lead wires 98, 98'. When the temporary mobility kit 18 is manipulated toward the docking system 90, a dielectric plate 104 extending from the upper wall of a recessed area 106 formed in the base of the temporary mobility kit 18 deflects the spring metal blade 102 away from the prongs 100, thereby interrupting the circuit, as illustrated in FIG. 7. A latch arm 108 also extends from the upper wall of the recessed area 106 for releasably holding the temporary mobility kit 18 to the docking system 90. An algorithm for interpreting and conveying information regarding the disconnection and presumed use of the temporary mobility kit 18 from the vehicle is set forth in FIG. 8. The first three steps parallel the first three steps of the time and temperature dependent algorithm set forth in FIG. 5 and discussed in relation thereto. Specifically, at a first step 110 the system is programmed to send a reminder to the message center 48 after a predetermined period has passed, the period being assessed by the timer 54. In the illustrated instance the period is four years. At a second step 112 the system calculates any degradation that may have been caused by elevated temperatures over time), the ambient temperature being determined by a temperature sensor 56. At a third step 114 the system calculates the time remaining as assessed by the timer 54, taking into account the information generated at the second step 112.

Figure 8:
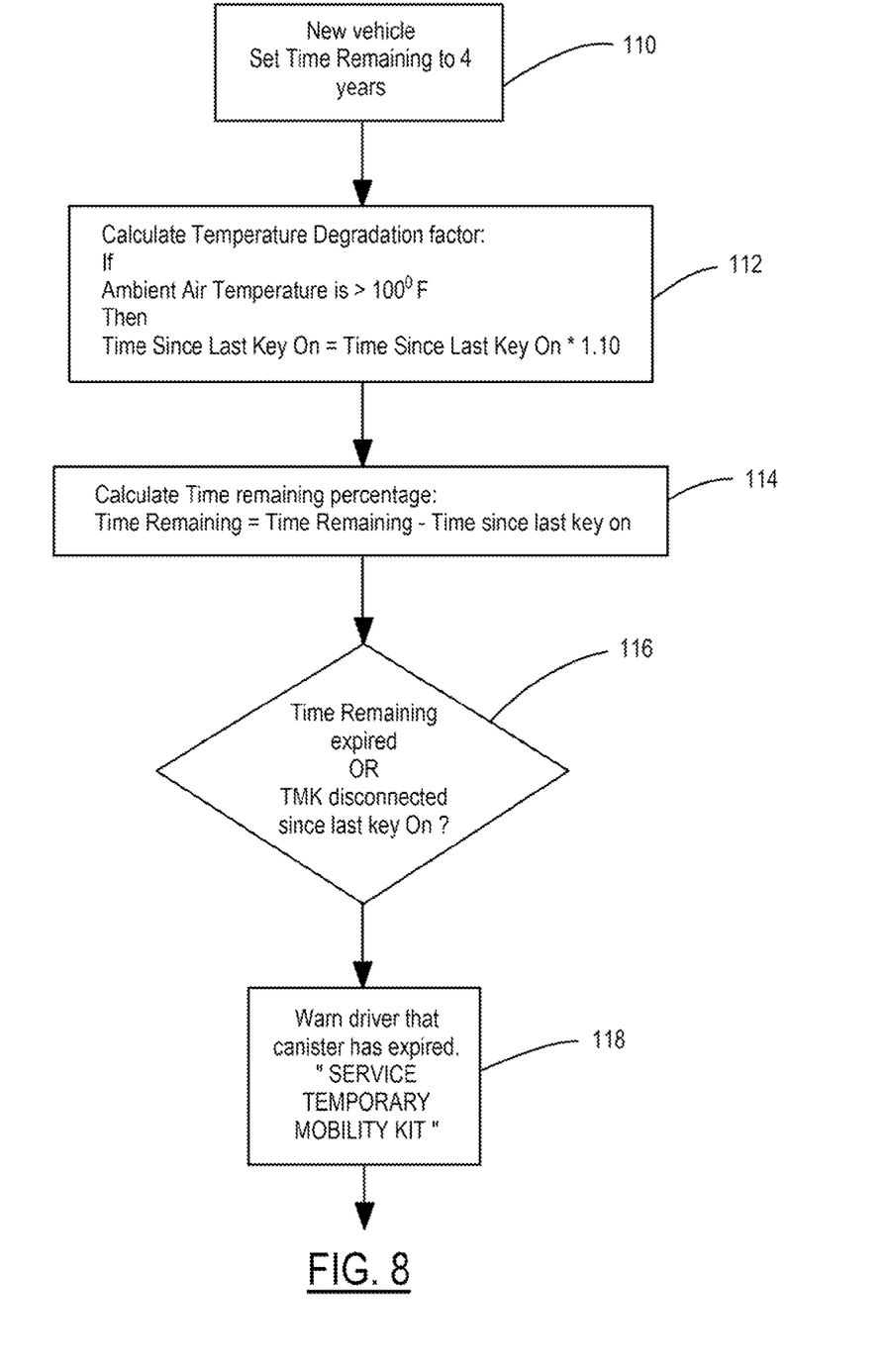
FIG. 8 is a flow chart according to a third embodiment of the disclosed invention.

At a fourth step 116 the system takes into account the information generated at the third step 114 and queries whether or not the sealant canister 26 is expired. In addition, at the fourth step 116 an additional query is made as to whether or not the temporary mobility kit 18 has been disconnected from the vehicle. The answer to this latter query is dependent upon whether or not the circuit operatively associated with the docking system 90 has been interrupted, as set forth above. At a fifth step 118, if the answer to either query at the fourth step 116 is "yes," then a message is sent by the controller 52 to the message center 48 in the form of an indication by the status/reminder indicator 50 that service is required. If replacement of the sealant canister 26 is required, a re-set operation set forth in the algorithm of FIG. E 4 is then undertaken after the sealant canister 26 has, in fact, been changed.

Figure 9:
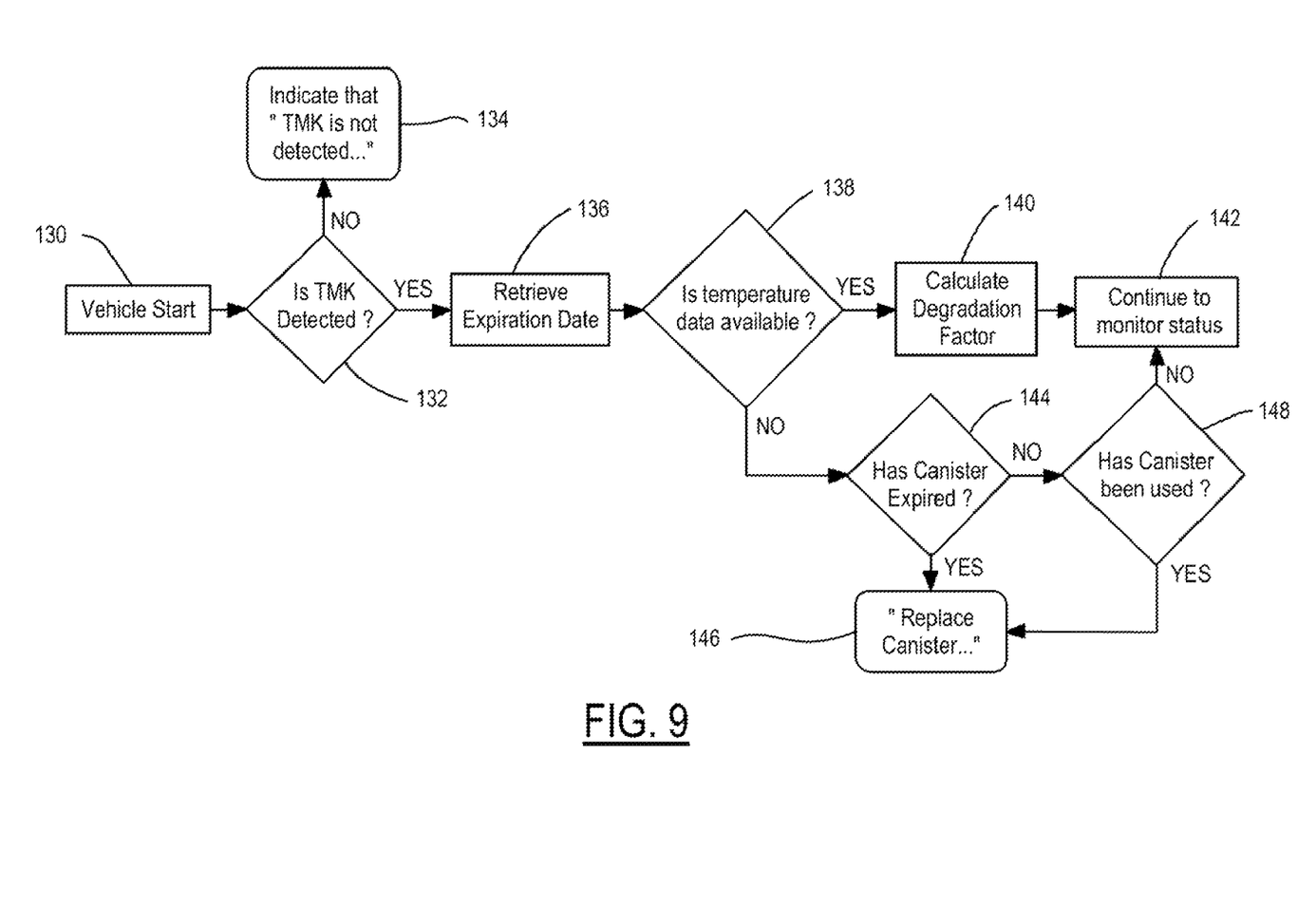
FIG. 9 is an alternate embodiment of the flow chart according to the third embodiment of the disclosed invention.

An alternative version of the algorithm for interpreting and conveying information regarding the disconnection and presumed use of the temporary mobility kit 18 from the vehicle is set forth in FIG. 9. According to this arrangement the procedures of the algorithm are initiated with the start of the vehicle at step 130. An initial inquiry is made as to whether or not the initiates an inquiry is made at step 130 whether or not the temporary mobility kit 18 is detected at step 132. If the temporary mobility kit 18 is not detected, then the status/reminder indicator 50 provided on the message center 48 displays an appropriate signal at step 134. If, instead, a temporary mobility kit 18 is detected at step 132, then the expiration data is retrieved at step 136. An inquiry is then made at step 138 as to whether or not temperature data is available. If it is determined at step 138 that temperature data is available, then the degradation factor of the sealant is calculated at step 140 and, at step 142, then monitoring of the status of the temporary mobility kit 18 continues.

If, on the other hand, it is determined that no temperature data is available at step 138, then an inquiry is made at step 144 as to whether or not the contents of the sealant canister 26 has expired based on the initial install date of the canister. A determination at step 144 that the sealant canister 26 has, in fact, expired will cause, at step 146, an appropriate indication by the status/reminder indicator 50. A determination that the sealant canister 26 has not expired at step 144 will cause an inquiry to be made at step 148 whether or not the sealant canister 26 has been used. If it is determined that the sealant canister 26 has not been used at step 148, then its status will continue to be monitored and no message will be sent. If, on the other hand, it is determined that the sealant canister has been used, then an appropriate indication will be made by the status/reminder indicator 50.

Figure 10:
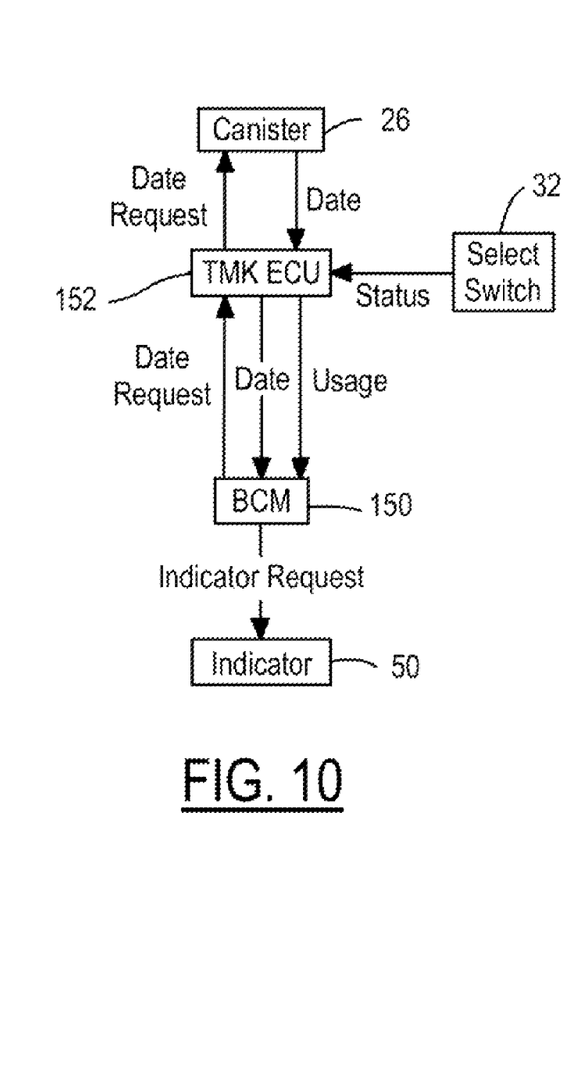
FIG. 10 is a data flow chart illustrating a first arrangement for monitoring temperature for use in the second and third embodiments of the disclosed invention.

The monitoring of ambient temperature and impact thereof on the tire sealant itself and the resulting analysis of whether or not an indication should be made that the sealant canister 26 should be changed may be made by different methods. Two of those methods are set forth herein as indicated by the data flow charts of FIGS. 10 and 11.

Figure 11:
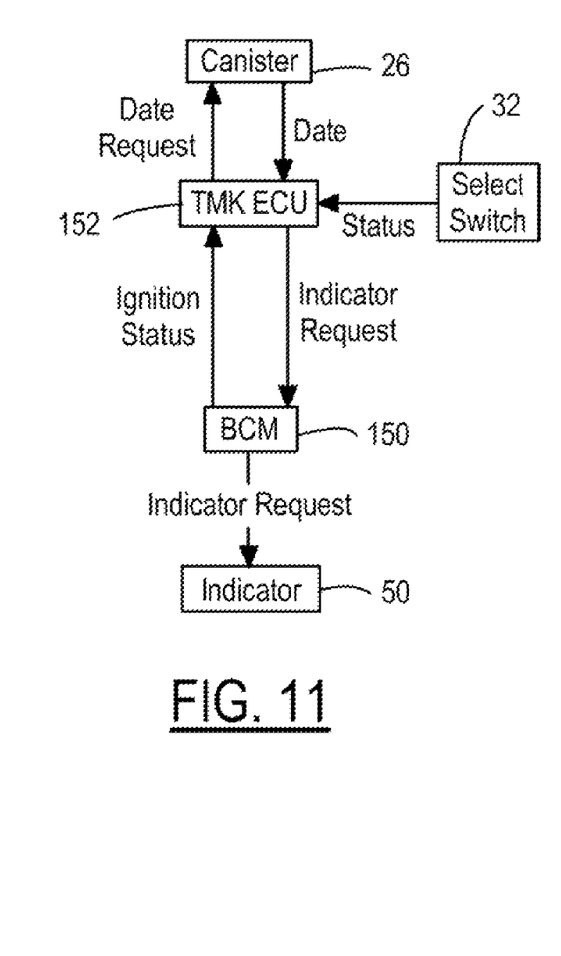
FIG. 11 is a data flow chart illustrating a second arrangement for monitoring temperature for use in the second and third embodiments of the disclosed invention.

With respect first to the data flow chart set forth in FIG. 11, data is initially requested by a body control module 150

(shown in a possible location relative to the instrument panel in FIG. 2, although it must be understood that the body control module 150 may be placed in a variety of other locations on the vehicle). An electronic control unit 152 of the temporary mobility kit 18 requests date information from the sealant canister 26. Once the electronic control unit 152 receives this information it sends this information as to the date as well as to usage of the temporary mobility kit 18 to the body control module 150. An indication will then be made by the status/reminder indicator 50 as deemed appropriate by the body control module 150.

An alternative approach to data flow is set forth in FIG. 11. In general, in this embodiment, all of the required system intelligence for responding to the need for replacing the sealant canister 26 is provided in the electronic control unit 152 of the temporary mobility kit 18. Thus the only interface required is an indication request from the temporary mobility kit 18 to the vehicle network. This may involve the above-noted temperature sensor on the sealant canister 26.

Particularly, according to the arrangement shown in FIG. 11, the body control module 150 sends information regarding the ignition status of the vehicle to the electronic control module 152 of the temporary mobility kit 18. The electronic control unit 152 of the temporary mobility kit 18 requests date information from the sealant canister 26. Once the electronic control unit 152 receives the date information it sends to the body control module 150 an indicator request. The body control module 150 interprets this information and initiates an indication by way of the status/reminder indicator 50 as deemed appropriate by the body control module 150.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A status indicator and reminder system for use with a vehicle having a fitting for a tire sealant-containing temporary mobility kit, the system comprising:
    a tire sealant-containing temporary mobility kit finable within the vehicle;
    an indicator;
    a timer generating a time signal corresponding to a time duration said temporary mobility kit has been in position in the vehicle;
    a controller coupled to said indicator and said timer, said controller generating a service warning signal in response to said time signal, said controller controlling said indicator in response to said timer signal.

2. The status indicator and reminder system of claim 1 further including a temperature sensor generating a temperature profile, said controller generating said service warning signal also in response to said temperature profile.

3. The status indicator and reminder system of claim 2 further indicating a feedback system to determine if said tire sealant-containing temporary mobility kit has been removed from the vehicle, said feedback system being operatively associated with said controller, said feedback system generating a signal when said tire sealant-containing temporary mobility kit has been removed from the vehicle.

4. The status indicator and reminder system of claim 3 wherein said feedback system includes a docking system, said docking system including a kit receiving recessed area and a conduit and wherein said tire sealant-containing temporary mobility kit includes a conduit, said conduit of said docking system and said conduit of said tire sealant containing temporary mobility kit being matable when said tire sealant-containing temporary mobility kit is positioned at least partially within said kit receiving recessed area.

5. The status indicator and reminder system of claim 4 wherein at least one of said conduits includes a shorting bar.

6. The status indicator and reminder system of claim 1 wherein said indicator comprises and audible or visual indicator.

7. A method of operating a monitoring system for a temporary mobility kit of a vehicle comprising:
    forming a status indicator and reminder system comprising a tire sealant-containing temporary mobility kit fittable within the vehicle, an indicator, a timer generating a time signal corresponding to a time duration said temporary mobility kit has been in position in the vehicle, and a controller coupled to said indicator and said timer, said controller generating a service warning signal in response to said time signal, said controller controlling said indicator in response to said timer signal;
    generating a time duration signal corresponding to a time said temporary mobility kit has been in position in the vehicle; and
    generating a signal in response to said time duration signal.

8. The method of claim 7 further including adding a temperature sensor for generating a temperature profile to said system, said controller generating said service warning signal also in response to said temperature profile.

9. The method of claim 8 further including generating a temperature profile signal and amending said time duration as may be needed in response to said temperature profile signal.

10. The method of claim 7 further including adding a feedback system to said system, said feedback system generating a signal when said tire sealant-containing temporary mobility kit has been removed from the vehicle.

11. The method of claim 10 wherein said feedback system includes a docking system, said docking system including a kit receiving recessed area and a conduit and wherein said tire sealant-containing temporary mobility kit includes a conduit, said conduit of said docking system and said conduit of said tire sealant-containing temporary mobility kit being matable when said tire sealant-containing temporary mobility kit is positioned at least partially within said kit receiving recessed area.

12. The method of claim 11 wherein at least one of said conduits includes a shorting bar.

13. The method of claim 7 wherein said indicator comprises and audible or visual indicator.

14. A method of operating a monitoring system for a tire sealant-containing temporary mobility kit of a vehicle comprising:
    programming a controller in the system to send a service signal to an indicator based on the passage of time;
    comparing the amount of time the temporary mobility kit has been in the vehicle compared with the programmed time in the controller;
    generating a service signal in the controller based on the comparison of the amount of time the temporary mobility kit has been in the vehicle and the programmed time.

15. The method of claim 14 further including the steps of programming a controller in the system to modify the generation of the service signal based upon ambient temperature and modifying the generation of the service signal as may he needed.

16. The method of claim 14 including the step of re-setting the system after the service signal has been sent.

17. The method of claim 14 including the steps of determining if the temporary mobility kit has been removed from the vehicle and generating a service signal in the controller based on said determination.

18. The method of claim 17 including the step of re-setting the system after the service signal has been sent.

19. The method of claim 16 including the step of providing a docking system operatively associated with said system into which the temporary mobility kit may be removably placed.

20. The method of claim 14 further including the steps of programming a controller in the system to modify the generation of the service signal based upon ambient temperature and modifying the generation of the service signal as may be needed and determining if the temporary mobility kit has been removed from the vehicle and generating a service signal based on said determination.

* * * * *